A. R. LE MOON.
FRICTION DRIVING MECHANISM.
APPLICATION FILED OCT. 31, 1908.
999,572.
Patented Aug. 1, 1911.
2 SHEETS—SHEET 1.
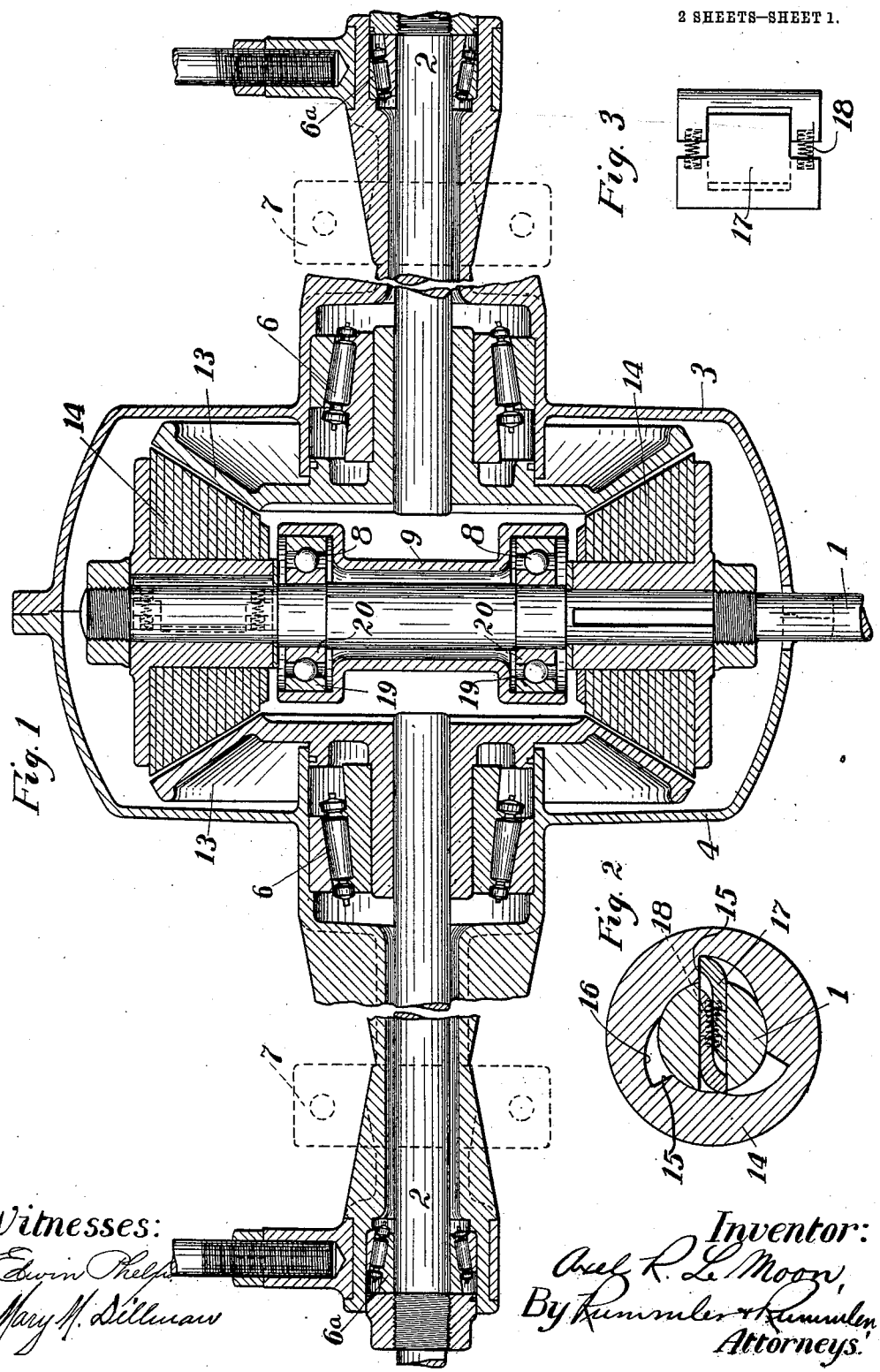
Witnesses:
Edwin Phelps
Mary M. Dillman
Inventor:
Axel R. Le Moon,
By Kummler & Kummler
Attorneys.

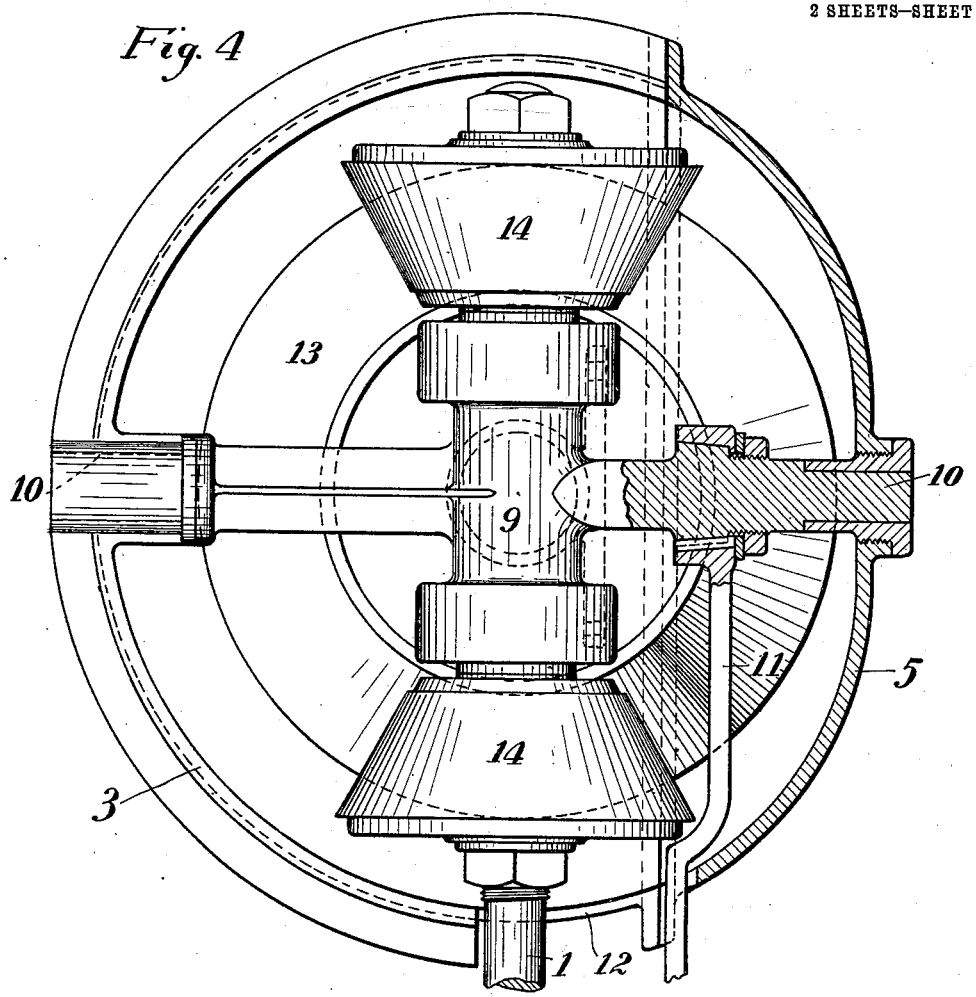
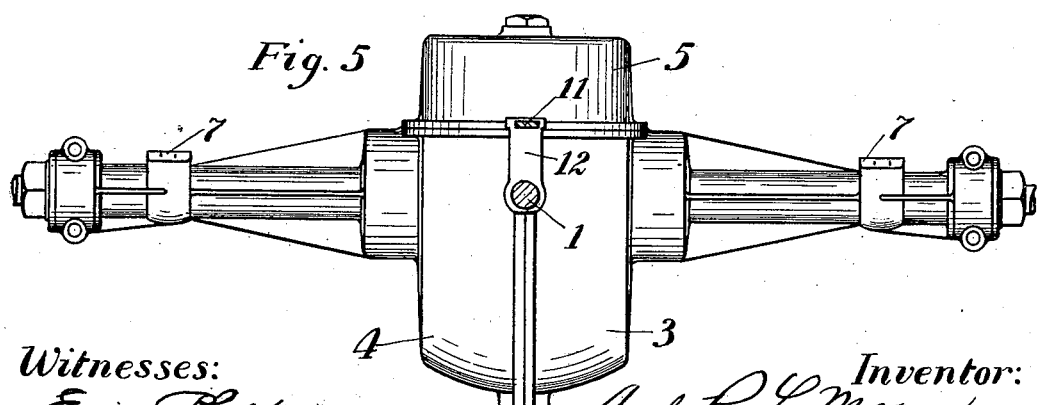

UNITED STATES PATENT OFFICE.

AXEL R. LE MOON, OF CHICAGO, ILLINOIS.

FRICTION DRIVING MECHANISM.

999,572.   Specification of Letters Patent.   Patented Aug. 1, 1911.

Application filed October 31, 1908. Serial No. 460,442.

*To all whom it may concern:*

Be it known that I, AXEL R. LE MOON, a citizen of the United States of America, and a resident of Chicago, county of Cook, State of Illinois, have invented certain new and useful Improvements in Friction Driving Mechanisms, of which the following is a specification.

The main objects of this invention are to provide an improved form of friction driving mechanism; to provide a device of this class which is particularly suitable for motor driven vehicles in that it is capable of performing the triple function of clutch for connecting the driving wheels with the motor, of reversing gear for reversing the direction of the rotation of the driving wheels without necessitating the reversing of the motor, and of differential driving gear which will allow either of the wheels to rotate faster than the other and faster than it is driven by the motor; to provide mechanism of this class which will effectually prevent skidding of the vehicle wheels because it will insure positive driving of both driving wheels, regardless of differences in the tractive resistance met by the wheels; and to provide an improved form of conical friction driving mechanism which is self-adjusting so as to insure substantially equal driving power for both vehicle wheels, regardless of unequal wear of the conical friction surfaces. These objects are accomplished by the device shown in the accompanying drawings, in which:

Figure 1 is a section of a friction driving mechanism constructed according to this invention, the plane of section being that of the axes of the driving and driven shafts. Fig. 2 is an enlarged detail of the ratchet mechanism within the hubs of the friction cones on the driving shaft. Fig. 3 is a detail of the ratchet pawl. Fig. 4 is an elevation, viewed from the right of Fig. 1 and showing the pivotal mounting of the driving shaft bearing, part of the casing and that driven shaft which is at the left side of Fig. 1 being removed. Fig. 5 is a front elevation, on a smaller scale, showing the construction of the supporting frame and casing, the driving shaft and operating lever being in section.

The device shown in the drawings is a specific embodiment of this invention particularly designed for use on a motor vehicle, in which the driving element or main shaft 1 operates a pair of separate driven elements or jack-shafts 2 which may be in turn connected with the rear or driving wheels of the vehicle either directly or by means of the usual chain and sprocket mechanism or similar means not shown.

In the form shown, the supporting frame is a hollow casing constructed of three main parts respectively designated 3, 4 and 5 in the drawings. The parts 3 and 4 are provided with tubular extensions which inclose the driven shafts 2 and support the bearings 6 and 6$^a$ thereof. These bearings are preferably roller bearings having conical rollers disposed so as to serve as antifriction rollers and also resist end thrust. The frame is hung from the frame of the vehicle by bolts engaging the pads 7. The ends of the driven shafts 2 are spaced apart sufficiently to provide room for the bearings of the driving shaft between them. The driving shaft 1 is journaled in ball bearings 8 in the bearing member 9, which in turn is pivotally mounted to oscillate on an axis disposed substantially at right angles to the plane of the axes of the shafts 1 and 2 and located substantially at the intersection thereof. As will be seen from Fig. 4, the member 9 is provided with pivots 10 which are journaled in bearings at opposite sides of the casing, and one of the pivots 10 has rigidly connected therewith an operating lever 11 which extends through an opening 12 in the casing. The shaft 1 should be connected with the motor by universal joints or other means, not shown, which will permit it to be oscillated on the pivots 10 without disturbing the connection between said shaft and the motor. Each of the driven shafts 2 has fixed at its inner end a friction wheel or cone 13, and the driving shaft 1 has journaled thereon a pair of friction wheels or cones 14. The working surfaces or faces of the cones 13 and 14 would, if extended, terminate in an apex common to all and located substantially at the intersection of the axes of the shafts 1 and 2. The hubs of the cones 14 fit the adjacent parts of the driving shaft 1 so as to permit said cones 14 to rotate freely on said shaft, and said hubs are provided with internal recesses which have radial shoulders 15 at one side, and gradually inclined surfaces 16 at the other side. (See Fig. 2.)

The shaft 1 is provided with a radial slot within which is seated an expansible pawl 17 formed of two parts normally urged apart by means of springs 18 so as to enter the recesses in the hub when in position to register therewith. From Fig. 2 it will be seen that the pawls 17 will drive both of the friction cones 14 in one direction, but will permit said cones to be driven at a speed in excess of the shaft 1 in the same direction.

The diameters of the friction cones 13 and 14 are such that when the shaft 1 is in the position shown in Fig. 1, the cones 14 will lie midway between the adjacent parts of the cones 13 and will not be in contact with either. A slight movement of the shaft 1 on its pivots 10 would urge the cones 14 into engagement with respectively opposite sides of different cones 13, thus insuring that the driven shafts 2 will always be driven in the same direction with respect to each other. The direction of rotation of the driven shafts 2 may be reversed by swinging the shaft 1 on its pivots 10 so as to shift each of the cones 14 into engagement with the opposite cone 13.

The outer rings 19, which form one of the ball races of each of the bearings 8 of the shaft 1, are loosely mounted within the bearing members 9 and are axially slidable therein. The inner collars 20 are tightly driven upon the shaft 1 and are neither rotatable nor shiftable with respect to said shaft. The loose outer rings 19 permit the shaft 1 to shift axially enough to insure equal bearing pressure between the two pairs of friction cones 13 and 14. This arrangement insures that there will always be an equal driving contact between each of the cones 14 and the respective cones 13.

The three-part casing is of particular advantage, since the cap 5 may be removed, permitting the removal of the friction cones 14 and the driving shaft 1 without disturbing the connection between the remaining parts of the casing and without disturbing the driven shafts 2 or their bearings.

The operation of the device shown is as follows:—When the parts are in the position shown in Fig. 1, the operating lever 11 will be in its middle position, and the shaft 1 may then be driven by the motor without driving the driven shafts 2. By shifting the operating lever 11 toward one side, the shafts 2 will be driven so as to drive the vehicle ahead, while by shifting said lever toward the other side, said shafts 2 will be driven in the reverse direction while the shaft 1 continues to turn in the same direction. On turning a corner, the wheel of the vehicle which is toward the inside of the curve will be positively driven by the motor, but the outer wheel, on account of traversing a greater distance, will, through its contact with the road, travel in excess of the speed at which it is driven. This will merely cause the corresponding cone 14 to be rotated faster than the driving shaft 1, which faster rotation is permitted by the ratchet within said cone 14. Neither wheel can by slipping or skidding divert the power away from the other wheel, as occurs with the usual form of planetary differential driving mechanism.

Although but one specific embodiment of this invention is herein shown and described, it will be seen that many of the details of the construction shown may be omitted or modified without departing from the spirit of this invention.

I claim:—

1. The combination of a pair of shafts journaled on intersecting axes, a pair of oppositely disposed friction cones secured against relative rotation on one of said shafts, a third cone on the other shaft, the surfaces of said cones being such that each, if continued, would terminate in an apex located substantially at the intersection of the axes of said shafts, one of said shafts being mounted in bearings adapted to oscillate on a transverse axis extending through the intersection of the axes of said shafts and adapted to permit said pair of cones to be brought alternately into mesh with said third cone for respectively driving said shafts in the same or opposite directions, said oscillatory shaft being free to move axially in said bearings.

2. The combination of a driving element having thereon a pair of opposite conical friction surfaces, each converging toward the other, a pair of separate driven elements journaled at opposite sides of said driving element and substantially in axial alinement with each other, the axes of said driven elements intersecting the axis of said driving element at a point intermediate between the said conical surfaces thereon, each of said driven elements having thereon a conical friction surface converging toward an apex located substantially at the intersection of the axes of said driving and driven elements, said driving element being mounted in bearings having trunnions of which the line of centers extends through the said intersecting axes, said driving element being free to move axially in said bearings, and means for oscillating said driving element on its trunnions for shifting its conical surfaces alternately into engagement with each of the friction surfaces of said driven elements.

3. The combination of driving and driven elements, a pair of friction wheels having positive operative relation with one of said elements, a third friction wheel having positive operative relation with the other element and journaled with different parts of its face respectively adjacent to the faces of said pair of wheels, means for relatively shifting said wheels for alternately engaging said pair of wheels with said third wheel for respectively driving said driven element in opposite directions, and ratchet means interposed between said driving element and the wheels thereon, whereby said wheels will be positively driven in one direction, but will be free to turn at a greater speed than that of said driving element.

4. The combination of driving and driven elements, a pair of friction wheels having positive operative relation with one of said elements, a third friction wheel having positive operative relation with the other element and journaled with different parts of its face respectively adjacent to the faces of said pair of wheels, means for relatively shifting said wheels for alternately engaging said pair of wheels with said third wheel for respectively driving said driven element in opposite directions, and separate ratchet means interposed between said driving element and each of the wheels thereon, whereby said wheels will be positively driven in one direction, but will be free to turn separately at a greater speed than that of said driving element.

5. The combination of a pair of driven shafts journaled in axial alinement, oppositely disposed friction cones on the adjacent ends of said shafts, a driving shaft extending transversely between said cones, a pair of friction cones on said driving shaft and located at opposite sides of said driven shafts and adapted to respectively engage opposite sides of the cones on said driven shafts so that said driven shafts will rotate in the same direction, a bearing for said driving shaft mounted intermediate of the cones thereon and adapted to oscillate to permit said cones to simultaneously engage opposite driving cones, and to be each shifted from one driven cone to the other for reversing the direction of rotation of the driven shafts, and means allowing one of said driving cones to revolve faster than the other.

6. The combination of a pair of driven shafts journaled in axial alinement, oppositely disposed friction cones on the adjacent ends of said shafts, a driving shaft extending transversely between said cones and a pair of friction cones thereon located at opposite sides of said driven shafts and adapted to respectively engage opposite sides of the cones on said driven shafts so that said driven shafts will rotate in the same direction, said driving shaft being mounted to oscillate on a transverse axis to permit the cones thereon to simultaneously engage opposite driven cones and to be each shifted from one driven cone to the other for reversing the direction of rotation of the driven shafts, said driving cones being adapted to shift axially to equalize their contact with their respective driven cones.

7. The combination of a pair of driven shafts journaled in axial alinement, oppositely disposed friction cones on the adjacent ends of said shafts, a driving shaft extending transversely between said cones and a pair of friction cones thereon located at opposite sides of said driven shafts and adapted to respectively engage opposite sides of the cones on said driven shafts so that said driven shafts will rotate in the same direction, said driving shaft being mounted to oscillate on a transverse axis to permit the cones thereon to simultaneously engage opposite driven cones and to be each shifted from one driven cone to the other for reversing the direction of rotation of the driven shafts, and separate ratchet devices interposed between the driving shaft and each of the cones thereon.

8. The combination of a driving element having thereon a pair of opposite conical friction surfaces, each converging toward the other, a pair of separate driven elements journaled at opposite sides of said driving element and substantially in axial alinement with each other, the axes of said driven elements intersecting the axis of said driving elements at a point intermediate between the said conical surfaces thereon, each of said driven elements having a conical friction surface converging toward the apex located substantially at the intersection of the axes of said driving and driven elements, said driving element being mounted in bearings adapted to swing said driving cones on a transverse axis into contact with either driven cone, said driving element being free to move axially in said bearings, and separate ratchet devices interposed between the driving shaft and each of the cones thereon.

Signed at Chicago this 28th day of October, 1908.

AXEL R. LE MOON.

Witnesses:
 Eugene A. Rummler,
 Mary M. Dillman.

---

Copies of this patent may be obtained for five cents each, by addressing the "Commissioner of Patents, Washington, D. C."